(12) United States Patent
Kubo et al.

(10) Patent No.: US 8,174,642 B2
(45) Date of Patent: May 8, 2012

(54) LIGHT GUIDE UNIT, ILLUMINATING DEVICE AND LIQUID CRYSTAL DISPLAY DEVICE

(75) Inventors: Tomoki Kubo, Osaka (JP); Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 286 days.

(21) Appl. No.: 12/599,110

(22) PCT Filed: Jul. 30, 2008

(86) PCT No.: PCT/JP2008/063682
§ 371 (c)(1),
(2), (4) Date: Nov. 6, 2009

(87) PCT Pub. No.: WO2009/028291
PCT Pub. Date: Mar. 5, 2009

(65) Prior Publication Data
US 2010/0238375 A1    Sep. 23, 2010

(30) Foreign Application Priority Data

Aug. 24, 2007   (JP) ................................. 2007-218887

(51) Int. Cl.
*G02F 1/1335* (2006.01)
*G09F 13/04* (2006.01)
(52) U.S. Cl. .............................. 349/62; 349/56; 362/97.1
(58) Field of Classification Search .................... 349/56, 349/61, 62, 65, 57; 362/97.1, 97.2, 97.3, 362/97.4
See application file for complete search history.

(56) References Cited

U.S. PATENT DOCUMENTS

| 6,241,358 | B1 | 6/2001 | Higuchi et al. ................. 362/31 |
| 6,469,755 | B1 | 10/2002 | Adachi et al. ................... 349/62 |
| 6,751,023 | B2 * | 6/2004 | Umemoto et al. ............ 359/599 |
| 7,160,015 | B2 * | 1/2007 | Parker .......................... 362/612 |
| 7,333,158 | B2 * | 2/2008 | Chien et al. ..................... 349/15 |
| 7,467,887 | B2 * | 12/2008 | Parker .......................... 362/633 |
| 7,857,476 | B2 * | 12/2010 | Pakhchyan et al. ........... 362/97.3 |
| 2002/0021563 | A1 | 2/2002 | Ohsumi ........................ 362/617 |
| 2002/0197051 | A1 | 12/2002 | Tamura et al. ................ 385/146 |

(Continued)

FOREIGN PATENT DOCUMENTS

JP        7-333442        12/1995

(Continued)

OTHER PUBLICATIONS

International Search Report for PCT/JP2008/063682, mailed Sep. 16, 2008.

*Primary Examiner* — Brian Healy
(74) *Attorney, Agent, or Firm* — Nixon & Vanderhye P.C.

(57) ABSTRACT

In a light guide unit (40) of the present invention, a light source (22) is provided on a first end section (24*d*) of a light guide (24). Further, a side reflective member (26*b*), which can reflect light in the light guide (24), is provided on a second end section (24*e*) opposite to the first end section (24*d*) which is provided with the light source (22). The light guide (24) is continuously increased in thickness (D2, D4, and D5) (i) from the first end section (24*d*) provided with the light source (22) toward a center of the light guide (24) and (ii) also from the second end section (24*e*) provided with the side face reflective member (26*b*) toward the center of the light guide (24).

14 Claims, 9 Drawing Sheets

U.S. PATENT DOCUMENTS

| | | | |
|---|---|---|---|
| 2003/0137821 A1 | 7/2003 | Gotoh et al. | 362/31 |
| 2005/0213347 A1* | 9/2005 | Kajiura | 362/615 |
| 2005/0264717 A1* | 12/2005 | Chien et al. | 349/61 |
| 2006/0061705 A1 | 3/2006 | Onishi | 349/62 |
| 2006/0132423 A1* | 6/2006 | Travis | 345/102 |
| 2008/0170414 A1* | 7/2008 | Wang | 362/612 |
| 2010/0238375 A1* | 9/2010 | Kubo et al. | 349/62 |

FOREIGN PATENT DOCUMENTS

| | | |
|---|---|---|
| JP | 2004-38108 | 2/2004 |
| JP | 2006-278251 | 10/2006 |
| JP | 2007-123086 | 5/2007 |

* cited by examiner

LIGHT GUIDE UNIT, ILLUMINATING DEVICE AND LIQUID CRYSTAL DISPLAY DEVICE

This application is the U.S. national phase of International Application No. PCT/JP2008/063682 filed 30 Jul. 2008 which designated the U.S. and claims priority to Japan Application No. 2007-218887 filed 24 Aug. 2007, the entire contents of each of which are hereby incorporated by reference.

TECHNICAL FIELD

The present invention relates to (i) a light guide unit which is used such as a backlight of a liquid crystal display device, (ii) an illuminating device, and (iii) a liquid crystal display device including the illuminating device.

BACKGROUND ART

In these years, liquid crystal display devices, which have rapidly become popular in replacement of cathode-ray tubes (CRT), are widely used in such as TVs, monitors, and mobile phones by making use of characteristics such as energy saving, thin body, and lightweight. Further, in some cases, an illumination device (i.e., a backlight) is provided in the rear of the liquid crystal display devices in the aim of spreading the use of the liquid crystal display device and improving display quality of the liquid crystal display device.

In order to achieve the improvement in the display quality and the like, upgrading of the illuminating device is desired.

The illuminating device can be classified mainly in a side-light type (edge-light type) and a direct type.

(Side-Light Type)

A side-light type illuminating device is an illuminating device including: a light guide plate; and a light source, wherein: in a case where the illuminating device is included in a liquid crystal display device, the light guide is positioned in the rear of a liquid crystal display panel of the liquid crystal display device; and the light source is provided on a lateral end section of the light guide.

In the side-light type illuminating device, light entered from the light source spreads over the entire light guide while repeatedly being reflected in the light guide, thereby indirectly illuminating the entire liquid crystal display panel evenly.

The side-light type configuration allows, even though a luminance is not so high, the illumination device to become thin and to have excellent uniformity of in-plane luminance. Accordingly, the side-light type illuminating device is used in small-and-medium-sized liquid crystal display devices such as a mobile phone and a laptop.

(Patent Literature 1)

Patent Literature 1 discloses an example of the side-light type illuminating device. That is, Patent Literature 1 discloses a surface emitting device in which a plurality of dots are formed on a reflective surface of a light guide plate so that light can be evenly emitted from a light emitting surface. In the surface emitting device, a corner section of the reflective surface does not become bright because light is not transmitted thereto due to a directivity of the light source. For avoiding the section being not bright, a density of dots in the corner section is higher than the other sections.

(Direct Type)

On the other hand, the direct type illuminating device is, unlike the side-light type illuminating device, an illuminating device in which a plurality of light sources are arranged in the rear of a liquid crystal display panel so as to directly illuminate the liquid crystal display panel.

The direct type illuminating device makes it possible to easily obtain a high luminance in a large-sized screen, thereby being used mainly for a large-sized liquid crystal display device (liquid crystal display) which has a size of 20 inches or more.

However, the current direct type illuminating device has a thickness of approximately 20 mm to 40 mm, and the thickness prevents the liquid crystal display from becoming thinner.

Actually, it is possible to achieve a thinner large-sized liquid crystal display by shortening a distance between the light source and the liquid crystal display panel. In that case, a larger number of the light sources are required for obtaining a uniform luminance of the illuminating device, and such increase of the number of the light sources leads to increase of the cost. In view of the disadvantage, it is desired to develop a thin illuminating device having excellent uniformity of luminance, without increasing the number of the light sources.

Conventionally, in order to solve the problem, it has been tried to achieve a thinner large-sized liquid crystal display by arranging a plurality of side-light type illuminating devices.

(Patent Literature 2)

For example, Patent Literature 2 discloses a surface emitting device which can achieve light emission in a large area while having a compact structure, thereby being suitable for use in a large-sized liquid crystal display. The surface emitting device has a tandem structure in which plate-like light guide blocks are tandemly arranged, and primary light sources are included for supplying primary light to the respective light guide blocks.

The illuminating device, as described above, is called as a tandem type illuminating device in which a plurality of light emitting units, each of which includes a combination of a light source and a light guide, are arranged.

CITATION LIST

Patent Literature 1

Japanese Patent Application Publication, Tokukai, No. 2003-43266 A (Publication Date: Feb. 13, 2003)

Patent Literature 2

Japanese Patent Application Publication, Tokukaihei, No. 11-288611 A (Publication Date: Oct. 19, 1999)

Patent Literature 3

Japanese Patent Application Publication, Tokukai, No. 2001-42328 A (Publication Date: Feb. 16, 2001)

Patent Literature 4

Japanese Patent Application Publication, Tokukaihei, No. 7-333442 A (Publication Date: Dec. 22, 1995)

Patent Literature 5

Japanese Patent Application Publication, Tokukai, No. 2007-123086 A (Publication Date: May 17, 2007)

SUMMARY OF INVENTION

However, the surface emitting device, which includes tandemly-arranged light guide blocks as described in Patent Literature 2, has a problem in that unevenness of connecting sections of the light guides cannot be prevented completely.

Further, in a case where the light guides are arranged in a stack, it is required to align positions of the light guides precisely.

Moreover, the method for arranging the light guides in a stack has a problem of poor reworkability in that all the light guides have to be removed even in a case where only one of the stacked light guides is to be removed.

(Patent Literature 3)

Moreover, Patent Literature 3 discloses a method for improving an incident efficiency of light to the light guide by providing collimating means to a light entering section of the light guide of the illuminating device.

In the method, a thin light guide is provided beside each of the light sources, and light is transmitted inside the light guide. Thus transmitted light is emitted from a light emitting surface.

In the method, however, the transmitted light is simply refracted by a prism shape (a triangular shape). The configuration has a problem of easily causing unevenness in luminance in the connecting section of the light guides.

(Patent Literature 4)

Moreover, Patent Literature 4 discloses a configuration in which a predetermined shape is provided to a light emitting surface of a light guide of an edge-shaped backlight unit.

The shape to be provided is, for example, a projection or a recess. A side opposite to the light source side has projections or recesses whose sizes are not uniform.

In the configuration, however, not a plurality of light guide plates are used together, but a single light guide plate is used. This causes a problem of insufficient in-plane uniformity.

(Patent Literature 5)

Patent Literature 5 discloses a shape of a light guide plate (light guide), in which a LED (Light Emitting Diode) is used as a light source, of a side-light (edge-light) type backlight. More specifically, Patent Literature 5 discloses a configuration in which an angle formed by (i) a front face of the LED serving as the light source and (ii) a prism shape between the LEDs is changed, whereby light can reach a section between the LEDs. This leads to a reduction of dark sections.

However, with the configuration, although unevenness of the section between the LEDs can be sometimes improved, uneven brightness of the entire display screen cannot be improved.

The present invention is accomplished in view of the problem, and an object thereof is to provide a light guide unit, illuminating device, and a liquid crystal display device which (i) can obtain a sufficient luminance even in a case where a light emitting area is large, and (ii) have a excellent uniformity of in-plane luminance while preventing a section such as vicinity of a light source from becoming brighter than the other sections.

A light guide unit of the present invention includes: a light source; and a light guide which performs surface emission of light received from the light source, wherein: the light source is provided on a first end section of the light guide; a reflective member which is capable of reflecting light in the light guide is provided on a second end section opposite to the first end section; the light guide is continuously increased in thickness from the first end section toward a center of the light guide; and the light guide is also continuously increased in thickness from the second end section toward the center of the light guide.

Moreover, in the illuminating device of the present invention, the light guide units of the present invention are arranged regularly.

With the configuration, even in a case where a plurality of light guides are arranged while the light sources are provided between the respective light guides for securing a sufficient luminance in a large-sized screen, it hardly occurs that light emitted upward from the light source is intercepted by an adjacent light guide. This makes it possible to prevent a bright section, which is brighter than the other sections, from being occurred in vicinity of the light source. The following describes the configuration.

In the configuration of the light guide unit, the light source is provided on the first end section of the light guide, and the light guide is continuously increased in thickness from the first end section. Moreover, the light guide is continuously increased in thickness also from the second end section opposite to the first end section.

Further, in a case where a plurality of the light guides and the light sources are arranged regularly, i.e., in a case where the light guide units are arranged regularly, one side of the light source is positioned on the first end section on which the light source is provided, and the other side of the light source is positioned on a section, of an adjacent light guide, opposite to the light source, i.e., an second end section of the adjacent light guide.

Further, in the configuration, the light guides positioned on both sides of the light source are increased in thicknesses from the end sections of the light guides, that is, from the first end section and from the second end section.

With the configuration, the light emitted upward from the light source is hardly intercepted by the light bodies in vicinity to the light source. As a result, it is possible to prevent a bias of a light emitting direction due to interception of the light emission. This leads to a prevention of an occurrence of a bright section (which is brighter than the other sections) in the vicinity of the light source provided between the light guides. Accordingly, in the illuminating device having the configuration, even in the configuration in which a plurality of light sources and light guides are arranged in a plane of a large-sized screen, the bright section is hardly occurred.

As described above, with the illuminating device having the configuration, a sufficient luminance can be obtained even in a case where a light emitting area is large. Further, it is possible to realize a light guide unit and an illuminating device having an excellent uniformity of in-plane luminance.

Moreover, in the light guide unit of the present invention, the light guide may have a mountain shape cross-sectionally, from the first end section to the second end section.

Moreover, the light guide unit of the present invention may be arranged such that: a slant face of the light guide in the mountain shape serves as a light emitting face for emitting the light received from the light source; the light emitting face includes at least two faces whose slant directions are different from each other; at least one of the light emitting faces slants so that a perpendicular line thereto is slanted toward the light source; and at least another one of the light emitting faces slants so that a perpendicular line thereto is slanted away from the light source.

With the configuration, the cross-sectional shape of the light guide is the mountain shape, and the light emitting faces are directed to a plurality of directions.

This improves uniformity of in-plane luminance of the illuminating device in which light received from the light source is emitted from surfaces of a plurality of light guides.

Moreover, the light guide can be easily held from the bottom by utilizing the mountain shape. This makes it possible to simplify the structure of the light guide unit and the illuminating device.

Moreover, in the light guide unit of the present invention, the light guide may have a stepped projection shape cross-sectionally, from the first end section to the second end section.

Moreover, in the light guide unit of the present invention, the stepped projection shape may have at least one step between (i) a top of the stepped portion and (ii) each of the first end section and the second end section.

With the configuration, the cross-sectional shape of the light guide is the stepped projection shape having at least one step.

In the configuration, a face from the top of the stepped projection shape to the end section has (i) an approximately parallel face (transverse plane) and (ii) an approximately perpendicular face (longitudinal plane) with respect to the bottom surface of the light guide.

With the configuration, a desired light-emitting property can be obtained easily, by adjusting (i) a position of the top of the stepped projection shape, (ii) slant angles of the transverse plane and the longitudinal plane, and (iii) a proportion of the transverse plane and the longitudinal plane. This leads to improvement in uniformity of in-plane luminance of the illuminating device including the light guide.

Moreover, in the light guide unit of the present invention, it is preferable that: the step is formed from a combination of a transverse plane and a longitudinal plane; the transverse plane and a bottom plane of the light guide form an angle of 0 degree or more but 60 degrees or less; and the transverse plane and the longitudinal plane form an angle of 90 degrees or more but less than 180 degrees.

With the configuration, in transmission of light in the light guide, the transverse plane totally reflects the light so that the light cannot be emitted outward from the light guide, and the light in the light guide can be emitted outward only from the longitudinal plane.

That is, the light from the light source enters the light guide and spreads in the entire light guide while repeatedly being totally reflected by the transverse plane, and only the light which reaches the longitudinal plane is emitted from the light guide.

With the configuration, a direction in which the light is emitted (light emitting direction) can be controlled easily. This prevents an uneven luminance from being seen in such as the connecting section of the light guides.

Moreover, in the light guide unit of the present invention, a prism may constitute the step.

With the configuration, the step can be easily formed with use of the prism.

Moreover, the use of the prism leads to a more precise control of a light path.

Moreover, in the light guide unit of the present invention, it is preferable that the light guide is provided with a reflective member on its bottom surface.

In the configuration, the reflective member which is capable of reflecting light is provided not only on the second end section opposite to the light source, but also on the bottom surface of the light guide.

Accordingly, the light entered the light guide from the light source is reflected by the reflective member provided on the bottom surface of the light guide, as well as totally reflected by the face forming the front surface of the light guide.

Accordingly, the light entered from the light source can be utilized more efficiently, whereby brightness of the illuminating device including the light guide unit can be improved, and the uneven in-plane luminance can be further reduced.

Moreover, in the light guide unit of the present invention, it is preferable that the second end section is thicker than or equal to the first end section.

Moreover, in the light guide unit of the present invention, it is preferable that the reflective member has a height greater in size than or equal to the thickness of the first end section.

With the configuration, it is possible to easily adjust an emission angle and an emission amount of light, which is received from the light source and then emitted from the surface of the light guide.

That is, in the light guide unit of the present invention, the light received from the light source is transmitted to the second end section opposite to the first end section while being repeatedly reflected inside the light guide. Then, the light is reflected by the reflective member provided on the second end section, thereby being changed in transmission direction, and transmitted toward the light source.

According to the configuration, (i) the thickness of the second end, section opposite to the light source and (ii) the height of the reflective member provided on the second end section are large.

Accordingly, it is possible to easily control an amount of the light transmitted toward the light source after reflected by the reflective member. This makes it possible to easily adjust the emission angle and the emission amount of the light emitted from the surface of the light guide.

Moreover, the emission amount of light can be easily adjusted by changing (i) the thickness of the thickest part of the light guide and (ii) the height of the second end section or the height of the reflective member provided on the second end section.

Moreover, in the light guide unit of the present invention, it is preferable that the prism has an apex angle of 90 degrees or more but less than 180 degrees.

With the configuration, the step can easily be formed by the prisms.

Moreover, the liquid crystal display device of the present invention is preferable to include the illuminating device as a backlight.

The liquid crystal display device includes the illuminating device as the backlight, thereby achieving a thin display having an excellent uniformity of in-plane luminance even in a large screen.

As described above, a light guide unit of the present invention includes: a light source; and a light guide which performs surface emission of light received from the light source, wherein: the light source is provided on a first end section of the light guide; a reflective member which is capable of reflecting light in the light guide is provided on a second end section opposite to the first end section; the light guide is continuously increased in thickness from the first end section toward a center of the light guide; and the light guide is also continuously increased in thickness from the second end section toward the center of the light guide.

Accordingly, even in a case where the light emitting area is large, a sufficient luminance can be obtained, and the uniformity of the in-plane luminance is excellent while preventing such as an occurrence of a bright section brighter than the other sections.

REFERENCE SIGNS LIST

1: Liquid Crystal Display Device
20: Backlight (Illuminating Device)
22: Light Source
24: Light Guide
24c: Bottom Surface
24f: Top
24s: Transverse Plane
24t: Longitudinal Plane
26: Reflective Member
40: Light Guide Unit

DESCRIPTION OF EMBODIMENTS

First Embodiment

One embodiment of the present invention is described below with reference to FIG. 1 to FIG. 8. Note that the present invention is not limited to this embodiment.

The present embodiment relates to an illuminating device which is used as a backlight of a liquid crystal display device.

(Liquid Crystal Display Device)

Figure 1:
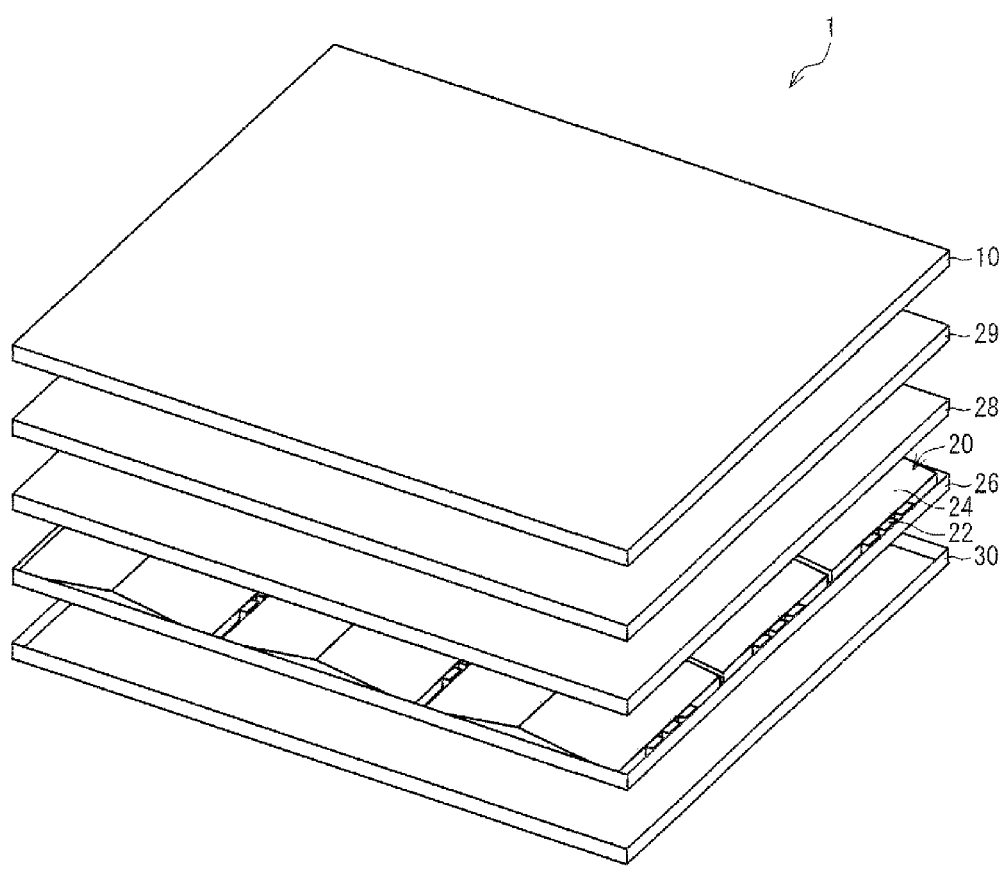
FIG. 1 is a perspective view illustrating a schematic structure of a liquid crystal display device in an embodiment of the present invention.

FIG. 1 is a perspective view illustrating a schematic structure of a liquid crystal display device 1 in the present embodiment.

The liquid crystal display device 1 in the present embodiment includes a liquid crystal display panel 10 and a backlight 20 as an illuminating device provided in the rear of the liquid crystal display panel 10.

(Liquid Crystal Display Panel)

The liquid crystal display panel 10 is similar to a general liquid crystal display panel used for a conventional liquid crystal display device. For example, such a liquid crystal display panel includes (i) an active matrix substrate in which a plurality of TFTs (Thin Film Transistor) are formed, (ii) a CF (Color Filter) substrate, and (iii) a liquid crystal layer which is sealed between the substrates by a sealing material.

(Backlight)

The following describes a configuration of the backlight 20 included in the liquid crystal display device 1.

As described above, the backlight 20 is provided in the rear (i.e. a side opposite to the display surface) of the liquid crystal display panel 10.

As shown in FIG. 1, the backlight 20 includes: a backlight substrate 30; a light source 22; a light guide 24; a reflective member 26; a diffusion panel 28; and an optical sheet 29.

Figure 2:
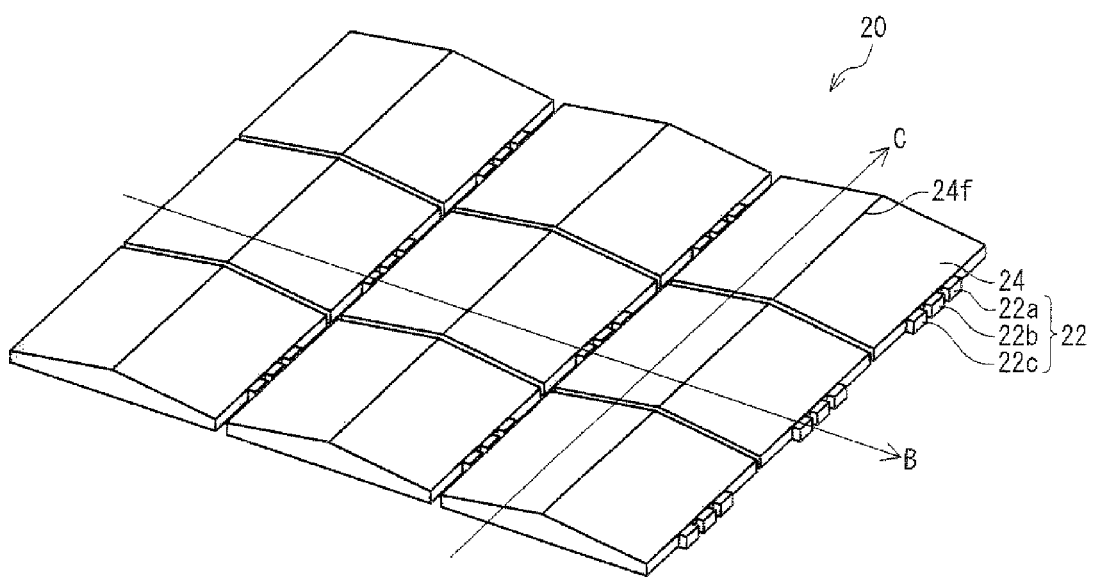
FIG. 2 is a perspective view illustrating an arrangement of a light source and a light guide in a backlight in the embodiment of the present invention.

The following is a more detailed description with reference to FIG. 2, which is a view illustrating an arrangement of the light source 22 and the light guide 24 of the backlight 20.

As shown in FIG. 2, in the backlight 20 of the present embodiment, a plurality of light guides 24 in a substantially rectangular shape are arranged in a matrix pattern. In the example of the backlight 20 shown in FIG. 2, a total of nine light guides 24 (three in each of lengthwise and crosswise rows) are arranged. With this arrangement, an entire surface of the backlight 20 is covered with the light guides 24.

The light source 22 is provided in vicinity to one of sides of the light guide 24 in the rectangular shape. In the backlight 20 shown in FIG. 2, the light sources 22 are provided (i) in each connecting section of the light guides 24 arranged adjacently (in a direction indicated by an arrow B in FIG. 2) in the grid pattern and (ii) on one of lateral ends of the backlight 20. With the arrangement, a total of nine light sources 22 are provided in the entire backlight 20.

Figure 3:
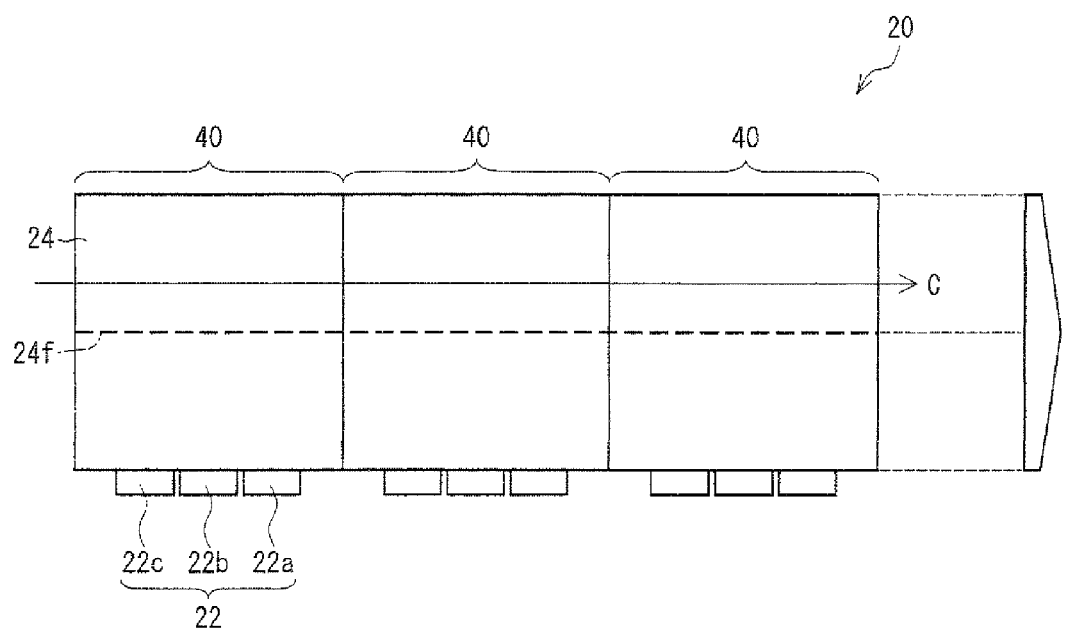
FIG. 3 is a top view illustrating the arrangement of the light source and the light guide in the backlight in the embodiment of the present invention.

The following describes a schematic shape and an arrangement of the light guides 24 with reference to FIG. 3. FIG. 3 is a top view illustrating an arrangement of the light source 22 and the light guide 24 in the backlight 20. Note that an arrow C in FIG. 3 corresponds to an arrow C in FIG. 2. As shown in FIGS. 2 and 3, each of the light guides 24 has a mountain shape having two slant faces, and the light guides 24 are arranged so that ridge lines (lines connecting tops 24f of light guides 24) of the mountain shapes are aligned.

Figure 4:
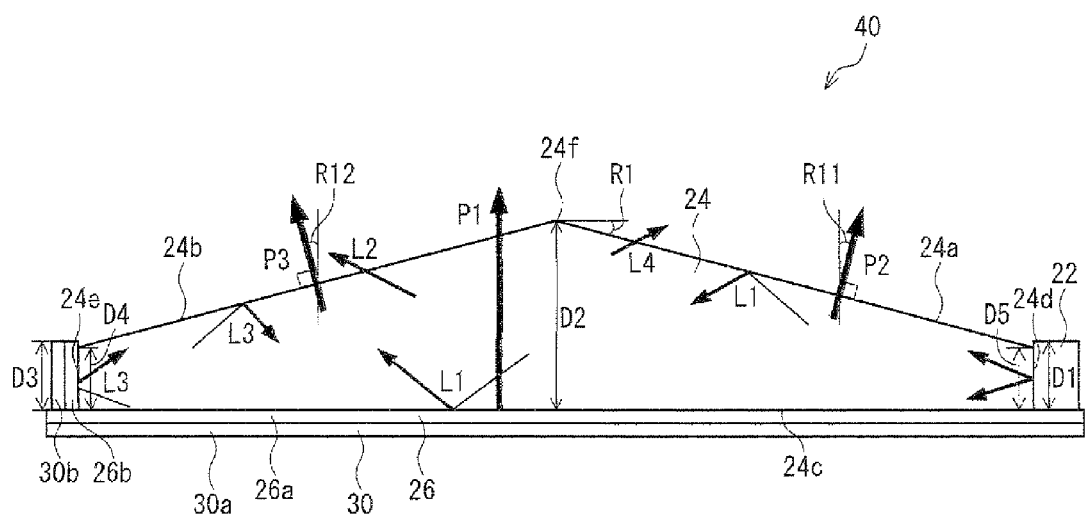
FIG. 4 is a cross-sectional view illustrating a schematic structure of a light guide unit in the embodiment of the present invention.

Note that, in examples of FIGS. 3 and 4, a plurality of light sources (red light source 22a, green light source 22b, and blue light source 22c) are provided on a single light guide 24. However, the present invention is not limited to the configuration. For example, only one light source may be provided on the single light guide 24.

Note that the light guide unit 40 includes the single light guide 24 and the single light source 22. The configuration of the light guide unit is described later together with a specific shape of the light guide 24.

(Light Source)

The light source 22 is not limited in particular. For example, a side emission type LED (Light Emitting Diode), a CCFL (Cold Cathode Fluorescent Lamp), or a HCFL (Hot Cathode Fluorescent Lamp) may be used as the light source 22. In particular, it is preferable to use the LED in view of that (i) the light source 22 can be miniaturized, whereby the backlight 20 can be thinner, and (ii) the connecting section of the light guides 24 can easily be smaller.

The following describes a case where the LED is used as the light source 22. Note that a illuminating device having a large color reproduction range can be achieved by including a side emission type LED, as the light source 22, in which three chips R (Red: red light source 22a), G (Green: green light source 22b), and B (Blue: blue light source 22e) are molded into a single package.

(Light Guide)

The following describes the light guide 24 in the present embodiment more in detail. The light guide 24 performs surface emission of light received from the light source 22.

(Light Guide Unit)

The following describes a configuration of the light guide unit 40 with reference to FIG. 4 which shows a cross-section of the light guide unit 40.

As shown in FIG. 4, the light guide unit 40 includes the projection shaped (mountain shaped) light guide 24 provided on the backlight substrate 30.

A reflective member 26 (bottom reflective member 26a) is provided between an entire bottom plane 30a of the backlight substrate 30 and an entire bottom surface 24c of the light guide 24.

Moreover, the light source 22 is provided on one end side (a first end section 24d) of the light guide 24. More specifically, in the light guide 24 having the substantially mountain shape and seen from above, substantially rectangular shape as described above, the light source 22 is provided on one (the first end section 24d) of two end sides (the first end section 24d and second end section 24e) which serve as feet of the mountain shape. As described above, the light source 22 is the side emission type LED, and as described later, light is transmitted inside the light guide 24 mainly along the backlight substrate 30 and then emitted outward from the light guide 24.

Moreover, the LED (light source 22) has a height (designated as "D1" in FIG. 4) which is approximately the same as a height (designated as "D5" in FIG. 4) of the first end section 24d of the light guide 24 on which the light source 22 is provided. That is, D1 is approximately equal to D5.

On the other hand, the reflective member 26 is provided on the other (the second end section 24e) of the two end sides serving as feet of the mountain shape. That is, the reflective member 26 is provided on the section opposite to the light source 22.

More specifically, as shown in FIG. 4, the backlight substrate 30 has a side wall 30b which (i) is substantially perpendicular to the bottom plane of the backlight substrate 30, and (ii) is provided on the bottom plane in vicinity of the second end side on which the light source 22 is not provided.

The side wall 30b of the backlight substrate 30A has a height (designated as "D3" in FIG. 4) which is approximately the same as a height (designated as "D4" in FIG. 4) of the end side of the light guide 24. That is, D3 is approximately equal to D4.

Further, the reflective member 26 (a side reflective member 26b), which is similar to the one provided on the bottom plane 30a of the backlight substrate 30, is provided on the side wall 30b.

That is, the side reflective member 26b is provided between the end section of the light guide 24 and the side wall 30b of the backlight substrate 30.

Note that, it is sufficient as long as the side reflective member 26b is provided in vicinity of the second end section 24e of the light guide 24. For example, various methods may be used, such as: a reflective sheet is attached to the second end section 24e directly; a reflective sheet is attached to the side wall 30b; and a reflective sheet is sandwiched between the side wall 30b and the second end section 24e.

The mountain shaped light guide 24 has the top 24f of the mountain shape approximately in the middle of the first end section 24d and second end section 24e. Further, the light guide 24 has approximately symmetric two slants formed between the top 24f and each of the end sections (the first end section 24d and the second end section 24e), i.e., between the top 24f and each of the light source 22 and the side reflective member 26b of the side wall 30b.

Further, the slant face formed between the top 24f of the mountain shape and the first end section 24d (light source 22 side) is a first light emitting face 24a. Further, the slant face formed between the top 24f of the mountain shape and the second end section 24e (side reflective member 26b side) is a second light emitting face 24b.

That is, the light guide 24 has the first light emitting face 24a and the second light emitting face 24b. A perpendicular line (indicated as a thick arrow "P2" in FIG. 4) to the first light emitting face 24a slants toward the light source 22 with respect to a perpendicular line (indicated as a thick arrow "P1" in FIG. 4) to a bottom surface 24c of the light guide 24, and a perpendicular line (indicated as a thick arrow "P3" in FIG. 4) to the second light emitting face 24b slants toward an opposite direction to the perpendicular line P2.

Further, the height D5 of the first end section 24d is approximately the same as the height D4 of the second end section 24e. Moreover, the first light emitting face 24a and the second light emitting face 24b are also approximately the same in size.

In the present embodiment, an angle of slant of the first light emitting face 24a with respect to the bottom surface 24c (an angle R1 in FIG. 4) is approximately 10 degrees. Similarly, an angle of slant of the second light emitting face 24b with respect to the bottom surface 24c is also approximately 10 degrees. Accordingly, (i) an angle (an angle R11 in FIG. 4) formed by the perpendicular line P2 to the first light emitting face 24a and the perpendicular line P1 to the bottom surface 24c, and (ii) an angle (an angle R12 in FIG. 4) formed by the perpendicular line P3 to the second light emitting face 24b and the perpendicular line P1 to the bottom surface 24c are 10 degrees, as with the angle R1.

In the light guide 24 of the present embodiment, the height (thickness) D5 of the first end section 24d adjacent to the light source 22 is approximately equal to the height (thickness) D4 of the second end section 24e adjacent to the side reflective member 26b. However, for example, the height D4 of the second end section 24c can be larger than the height D5 of the first end section 24d.

(Transmission of Light in the Light Guide)

The following describes a transmission of light in the light guide unit 40 of the present embodiment with reference to FIG. 4. Arrows L1, L2, L3, and L4 in FIG. 4 indicate directions in which the light transmits.

As shown in FIG. 4, the light emitted from the light source 22 first enters the light guide 24 while being diffused to some extent.

Then, the light is transmitted from the first end section 24d to the second end section 24e in the light guide 24 while being repeatedly reflected by the reflective member 26 (the side reflective member 26b) provided on the bottom surface 24c of the light guide 24, and being totally reflected by the first light emitting face 24a.

The light is partially emitted from the second light emitting face 24b while being transmitted from the first end section 24d to the second end section 24e. The rest of the light reaches the side reflective member 26b.

The light which has reached the side reflective member 26b is reflected from the surface of the side reflective member 26b, and a main traveling direction of the light is reversed. That is, the light reflected by the side reflective member 26b is traveled from the second end section 24e to the first end section 24d in the light guide 24. The light is then emitted mainly from the first light emitting face 24a.

As described above, according to the light guide unit 40 of the present embodiment, the light is emitted in different directions form the first light emitting face 24a and from the second light emitting face 24b which are slanted in different directions from each other. This improves uniformity of in-plane luminance. More specifically, unevenness of a luminance is hardly occurred in a connecting section of the light guide units 40, i.e., a connecting section of the light guides 24. The following describes this feature.

(In-Plane Luminance)

In general, the connecting section of the light guides 24, in which the light source 22 is provided, sometimes causes the section (the bright section) brighter than the other sections. The bright section tends to reduce the uniformity of the in-plane luminance.

On the other hand, in the backlight 20 of the present embodiment, the bright section is hardly occurred, thereby preventing the reduction of the uniformity of the in-plane luminance.

(Conventional Backlight)

Figure 9:
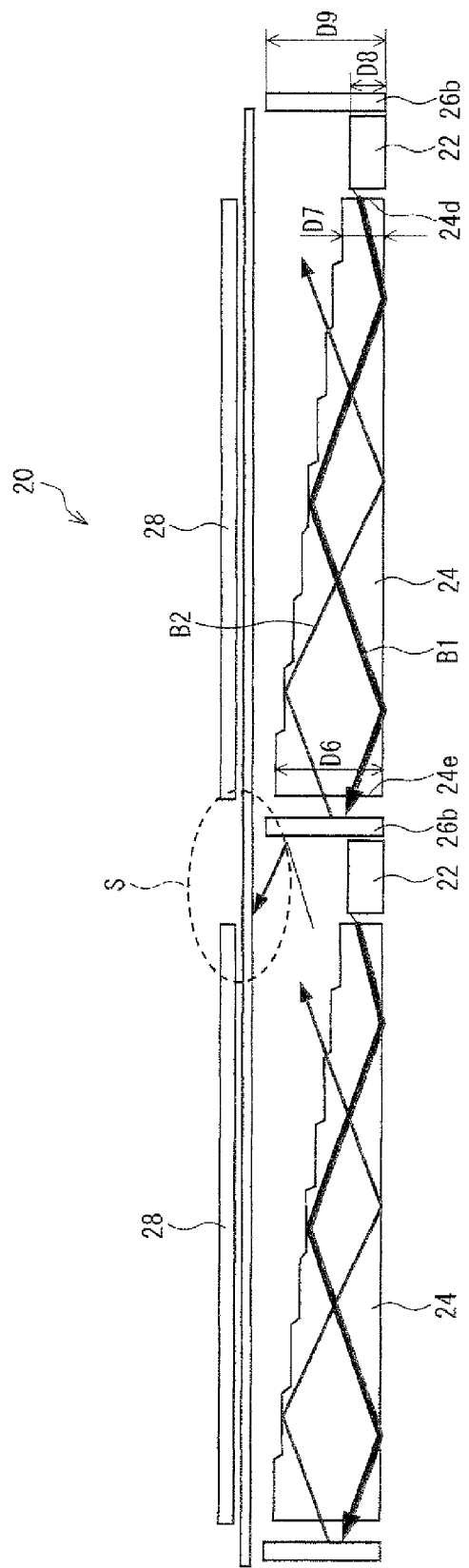
FIG. 9 is a cross-sectional view illustrating a schematic structure of a conventional backlight.

The following is a comparison between a conventional backlight 20 and the backlight 20 of the present embodiment. FIG. 9 is a cross-sectional view illustrating a schematic structure of the conventional backlight 20.

The backlight 20 of the present embodiment and the conventional backlight 20 shown in FIG. 9 are different mainly in sectional-shapes of each of the light guides 24 and in positions where each of the reflective members 26 is provided.

(Difference of Light Guide)

That is, as shown in FIG. 9, the sectional-shape of the light guide 24 of the conventional backlight 20 has substantially a wedge shape, unlike the stepped projection shape (mountain shape) in the present embodiment. That is, the sectional-shape is decreased in thickness from one end to the other end.

(Difference of Reflective Member)

Moreover, the conventional backlight 20 and the backlight 20 of the present embodiment are different as to the reflective member 26. In particular, the conventional backlight 20 and the backlight 20 of the present embodiment are different in positions of each of the reflective members 26 provided so as to be perpendicular to the bottom surface 24c of the light guide 24.

That is, as shown in FIG. 9, in the conventional backlight 20, a total of two reflective members 26 (side reflective members 26b) are provided on both the end sections of the light guide 24.

That is, the side reflective members 26b are provided in vicinity of both (i) the first end section 24d to which the light source 22 is provided adjacently and (ii) the second end section 24e to which the light source 22 is not provide adjacently.

On the other hand, in the backlight 20 of the present embodiment, the side reflective member 26b is provided only on one of the two end sections of, for example, the light guide 24 shown in FIG. 4. That is, the side reflective member 26b is provided only on the end section (the second end section 24e) on which the light source 22 is not provided, but the side reflective member 26b is not provided in the vicinity of the first end section 24d being close to the light source 22.

(Bright Section)

In the backlight 20 of the present embodiment, the bright section is hardly occurred due to the difference of the configurations.

That is, the bright section is assumed to be occurred because of two factors.

One of the factors is that light emitted from the light source 22 is reflected by the reflective member 26 provided in the vicinity of the light source, whereby the bright section is occurred.

The other of the factors is that light emitted from the light source 22 is intercepted by an other member, whereby light cannot be emitted uniformly in all directions, thereby causing the bright section.

(Bright Section by Reflection)

The following describes the bright section by the reflection.

As shown in FIG. 9, in the conventional backlight 20, the light guide 24 has the wedge shape as above described. Further, the light source 22 is provided on an apical end of the wedge shape, that is, the first end section 24d which is the thinner end of the light guide 24.

Accordingly, assuming that a single light source 22 is provided on a single light guide 24, the reflective member 26 needs to be provided on the second end section 24e which is opposite to the end section on which the light source 22 is provided.

Further, the conventional light guide 24 has the wedge shape in which a height (thickness) (D6 shown in FIG. 9) of the second end section 24e becomes greater than a height (thickness) (D7 shown in FIG. 9) of the first end section 24d. Further, a height (D9 shown in FIG. 9) of the side reflective member 26b, that is, the reflective member 26 provided on the second end section 24e becomes equal to the height D6 of the second end section 24e.

On the other hand, a height (D8 shown in FIG. 9) of the light source 22 provided on the first end section 24d is approximately equal to the height D7 of the first end section 24d.

Accordingly, as shown in FIG. 9, in comparison of the light source 22 and the side reflective member 26b in height, the side reflective member 26b is higher than the light source 22.

As a result, the side reflective member 26b, which is higher than the height D8 of the light source 22, is provided near a side, of the light source 22, opposite to a side close to the light guide 24.

With the arrangement, the bright section is formed by the reflection in the vicinity of the light source 22.

The following describes a transmission of light emitted from the light source 22.

The light emitted from the light source 22 enters the light guide 24 via the first end section 24d of the light guide 24. The light is then transmitted in the light guide 24 toward the second end section 24e. The light which has reached the second end section 24e is reflected by the side reflective member 26b provided on the second end section 24e, thereby changing in direction thereof, and is transmitted toward the first end section 24d.

Then, (i) the light which has reached the first end section 24d and (ii) the light emitted externally from the light guide 24 after being reflected by the side reflective member 26b are partially reflected by the side reflective member 26b provided in the rear of the light source (i.e. the side reflective member 26b pertain to the adjacent light guide unit) (see a region S in FIG. 9).

This is because, as described above, the height D9 of the side reflective member 26b is greater than the height D8 of the light source 22.

The reflection by the side reflective member 26b of the adjacent light guide 24 causes the bright section, which has a higher luminance than the other regions, to be formed in the vicinity to the light source 22 (i.e., in the region S).

On the other hand, in the backlight of the present embodiment, the reflection by the side reflective member 26b of the adjacent light guide 24 is hardly occurred, whereby the bright section is hardly formed. The following describes this feature with reference to FIG. 5.

Figure 5:
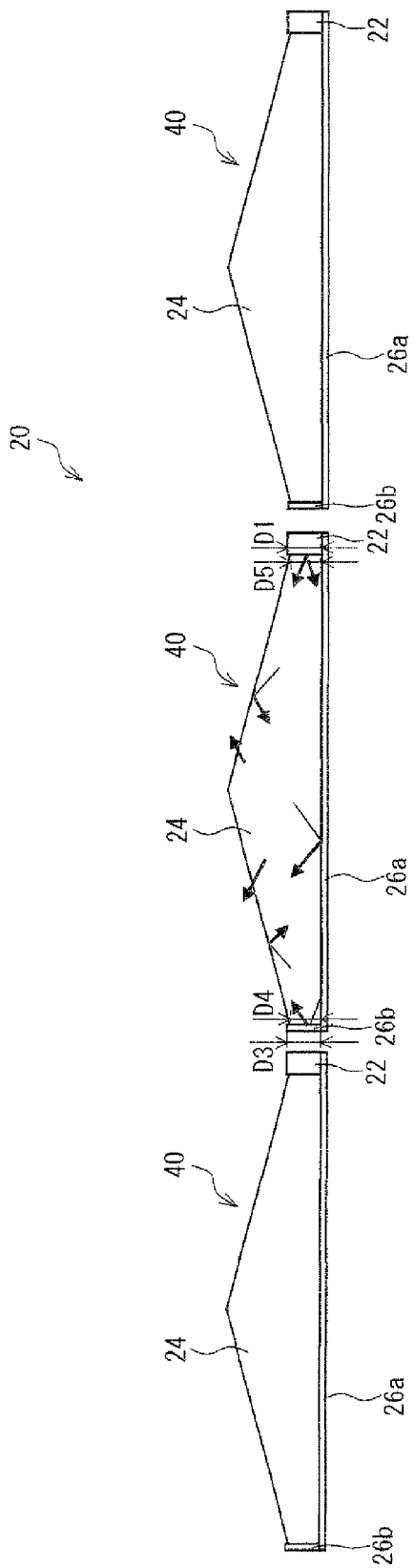
FIG. 5 is a cross-sectional view illustrating a schematic structure of a backlight in the embodiment of the present invention.

FIG. 5 is a cross-sectional view illustrating a schematic structure of the backlight 20 of the present embodiment.

As shown in FIG. 5, in the backlight 20 of the present embodiment, the light guide 24 has a mountain shape, not a wedge shape. Accordingly, in the light guide 24, the height D5 of the first end section 24d and the height D4 of the second end section 24*e* are less different than those in the conventional wedge shape, and become approximately equal to each other.

Accordingly, in a case where the light emitted from the light source 22, which is transmitted in the light guide 24 and then reflected by the side reflective member 26*b*, is returned to the vicinity of the light source 22, the light is hardly reflected by the side reflective member 26*b* provided on the adjacent light guide 24.

This is because, in the backlight 20 of the present embodiment, (i) the height D5 of the first end section 24*d*, (ii) the height D4 of the second end section 24*e*, (iii) the height D3 of the side reflective member 26*b*, and (iv) the height D1 of the light source 22 are approximately equal to each other.

Figure 6:
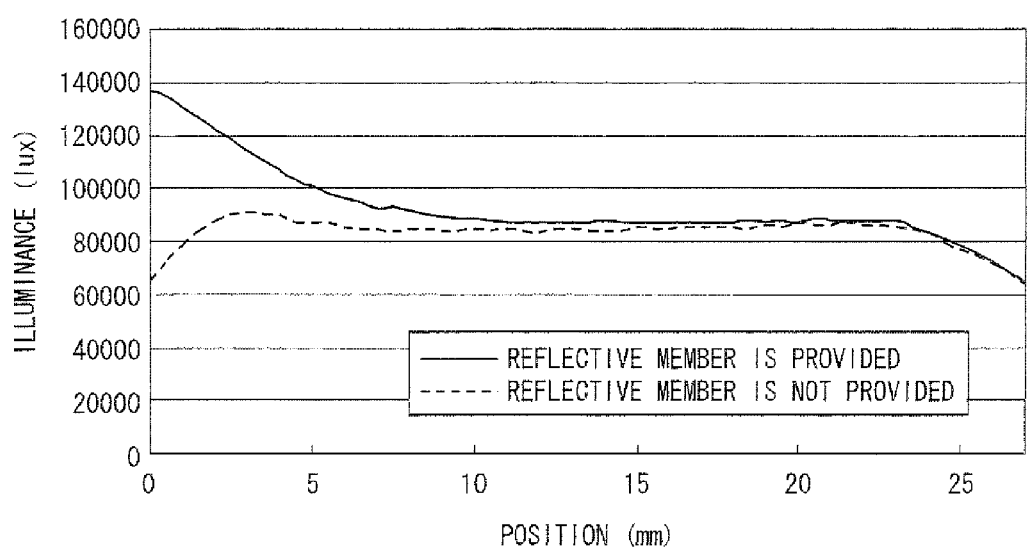
FIG. 6 is a graph illustrating simulation results of luminance distribution according to whether a reflective member is provided or not.

The following describes a reduction of the reflection with reference to FIG. 6, which is a graph illustrating simulation results of luminance distribution according to whether a reflective member is provided or not.

As shown in FIG. 6, in a case where the side reflective member 26*b* which is higher than the light source 22 is provided in the vicinity to the light source 22 (conventional example), the side reflective member 26*b* reflects light more intensely, whereby a luminance becomes high at a position 0 shown in FIG. 6 (in the vicinity to the light source 22).

On the other hand, in the present embodiment, the light guide 24 has the projection shape (mountain shape) and the side reflective member 26*b* is not higher than the light source 22. This leads to a reduction of the reflection by the side reflective member 26*b*, whereby the bright section in the vicinity to the light source 22 is reduced. That is, unevenness of brightness in the vicinity to the connecting section of the light guides 24 is reduced.

As described above, in the backlight 20 of the present embodiment, the bright section (by the reflection) is hardly occurred because the light, which is emitted from the light source 22, is hardly reflected by the side reflective member 26*b* provided on the adjacent light guide 24. As a result, the uniformity of in-plane luminance is hardly reduced.

(Bright Section by Light Shielding)

The other of the reasons of the formation of the bright section is that light emitted from the light source 22 is intercepted by an other member, whereby light cannot be evenly emitted in all directions. This leads to the formation of the bright section.

As shown in FIG. 9, in the conventional backlight 20, the light guide 24 has the wedge shape, and the light source 22 is provided between the wedge shaped light guides 24.

With the configuration, the height of the end section of the light guide 24 which contacts with one side of the light source 22 (i.e., the height D7 of the first end section 24*d*) is low, whereby the light emitted from the light source 22 is hardly intercepted. However, the heights of (i) the end section the light guide 24 which contacts with the other side of the light source 22 and (ii) the reflective member 26 (i.e., the height D6 of the second end section 24*e* and the height D9 of the side reflective member 26*b*) are high, whereby the light emitted from the light source 22 is sometimes intercepted.

That is, structures adjacent to the respective sides of the light source 22 are different in height, whereby the light from the light source 22 cannot be evenly emitted in both rightward and leftward. This leads to a formation of the bright section, in the vicinity to the light source 22, which has a luminance different from that of the other sections.

On the other hand, in the backlight 20 of the present embodiment, as shown in FIG. 5, the light guide 24 has the mountain shape. Accordingly, the heights of the end section of the light guide 24 and the reflective member 26, which are adjacent to right and left sides of the light source, respectively, (the height D7 of the first end section 24*d*, the height D6 of the second end section 24*e*, and the height D9 of the side reflective member 26*b*) are approximately equal to each other, and the heights are low.

With the configuration, the light emitted from the light source 22 is not intercepted on both right and left sides, thereby being emitted evenly. As a result, the bright section is hardly occurred.

As described above, according to the backlight 20 of the present embodiment, in a case where a plurality of the light sources 22 and the light guides 24 are provided in a plane of a large-sized screen, the bright sections are hardly occurred in the vicinity of the light sources 22 provided in the plane.

Accordingly, in a case where a light emitting area is large, it is possible to realize an illuminating device having excellent uniformity of in-plane luminance.

(Surface Treatment of Light Guide)

Note that, although not illustrated, it is possible to treat or process the light emitting faces of the light guide 24 (the first light emitting face 24*a* and the second light emitting face 24*b*) and the bottom surface 24*e* so that the transmitted light can be emitted frontward. Such treatment or process allows the light to be emitted more efficiently from the light emitting faces of the light guide 24 (the first light emitting face 24*a* and the second light emitting face 24*b*).

A specific method of the treatment or process encompasses such as a prism processing, a surface texturing, and a print processing. Note that the method is not limited to these examples, and a known method can be used as appropriate.

Note that a detail of the prism processing on the light emitting face is described later.

(Material of Light Guide)

A material for forming the light guide 24 is not particularly limited. For example, transparent resin such as PMMA (Polymethylmethacrylate) or polycarbonate can be used. In particular, a material which has a high light transmittance is preferable.

(Production Method of Light Guide)

The light guide 24 can be formed by such as an injection molding, an extrusion molding, a heat press molding, or a cutting processing. However, the method is not limited to those forming methods, and it is sufficient as long as the processing can achieve a similar property.

(Reflective Member)

The following describes the reflective member 26 in detail. In the present embodiment, the reflective member 26 is provided so as to contact with the bottom surface 24*c* of the light guide 24. That is, the reflective member 26 (bottom reflective member 26*a*) is provided between the bottom surface 24*c* of the light guide 24 and the bottom plane 30*a* of the backlight substrate 30.

Further, in the present embodiment, the side reflective member 26*b* is provided on the one end section of the light guide 24 (i.e., the second end section 24*e* which is opposite to the first end section 24*d* on which the light source 22 is provided), in addition to the bottom reflective member 26*a*. That is, the reflective member 26 (side reflective member 26*b*) is provided between the second end section 24*e* of the light guide 24 and the side wall 30*b* of the backlight substrate 30.

(Attaching Method of Reflective Member)

An attaching method of the reflective member is not limited in particular. As described above, the method encompasses such methods in that (i) a reflective sheet formed by a resin film on which a metal is vapor-deposited is attached to a desired position of the light guide 24, and (ii) the reflective sheet is sandwiched in a desired position between the light guide 24 and the backlight substrate 30.

Moreover, in another method, a reflective layer may be formed directly in a desired position on the light guide 24 with use of such as vapor deposition.

The reflective member 26 allows the light received from the light source 22 to be emitted more efficiently from the light emitting faces of the light guide 24.

(Diffusion Panel)

The following describes the diffusion panel 28. As shown in FIG. 1, the diffusion panel 28 of the present embodiment is provided so as to cover and face the entire light emitting face of the back light 20, which includes the light emitting faces (the first light emitting face 24a and the second light emitting face 24b) of the light guides 24. Further, the diffusion panel 28 is provided while being away from the light emitting faces by a predetermined distance.

The diffusion panel 28 diffuses light received from the light emitting faces of the light guide 24, and illuminates the optical sheet 29, which is described later. In the present embodiment, "SUMIPEX E RML10 (trade name)" manufactured by Sumitomo Chemical Co., Ltd. having a thickness of 2.0 mm is used as the diffusion plate 28. Moreover, the predetermined distance from the light emitting faces of the light guide 24 is set to approximately 3.0 mm.

Moreover, in order to keep a constant distance between the light emitting faces of the light guide 24 and the diffusion plate 28, a holding member may be provided. The holding member is not limited in its shape. For example, the holding member may have a cylindrical shape. Alternatively, the holding member may have a taper shape, such as a conical shape, so as not to intercept the light emitted from the light emitting faces of the light guide 24.

As with the light guide 24 and the diffusion plate 28, it is preferable that transparent resin such as polycarbonate is used as a material of the holding member.

(Optical Sheet)

The following describes the optical sheet 29. The optical sheet 29 of the present embodiment is provided so as to cover the diffusion plate 28 as shown in FIG. 1. The optical sheet 29, which includes a plurality of sheets, uniformizes and collects the light received from the light emitting faces of the light guide 24, and illuminates the liquid crystal display panel 10. The optical sheet 29 may be, for example: a diffusion sheet for scattering light while collecting the light; a lens sheet for improving a luminance forefront (in a direction toward the liquid crystal display panel 10) by collecting light; and a polarized reflection sheet for improving a luminance of the liquid crystal display device 1 by reflecting one of polarization components of light and transmitting the other of polarization components of light.

It is preferable to use those sheets in a combination as appropriate in accordance with a price and a performance of the liquid crystal display device 1. Note that, for example in the present embodiment: "LIGHT-UP 250GM2 (trade name)" manufactured by Kimoto Co., Ltd. is used as the diffusion sheet; "ThickRBEF (trade name)" manufactured by Sumitomo 3M Ltd. is used as the prism sheet; and "DBEF-D400 (trade name)" manufactured by Sumitomo 3M Ltd. is used as the polarization sheet.

With the configuration, as shown in FIG. 4, the light emitted from the light source 22 is transmitted in the light guide 24 while being scattered and reflected, and then emitted from the light emitting faces (the first light emitting face 24a and the second light emitting face 24b). Thus emitted light reaches the liquid crystal display panel 10 via the diffusion plate 28 and the optical sheet 29.

Second Embodiment

Figure 7:
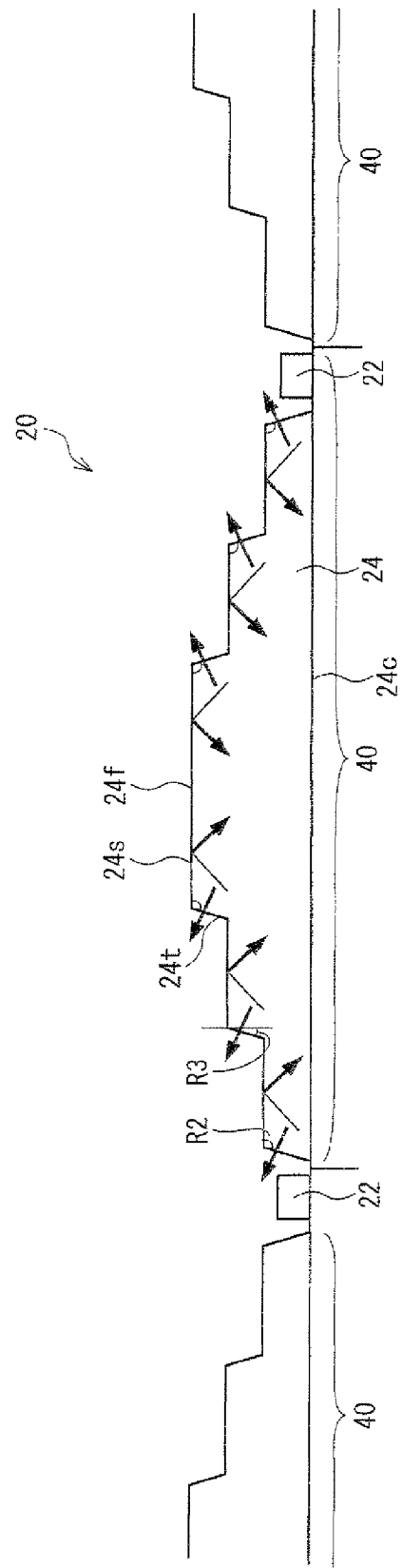
FIG. 7 is a cross-sectional view illustrating a schematic structure of a backlight in another embodiment of the present invention.

The following describes a second embodiment with reference to FIG. 7. Note that configurations which are not described in the present embodiment are the same as those in the first embodiment. Moreover, for convenience of explanation, members having the same functions as those shown in the drawings of the first embodiment are given the same reference numerals, and explanations of the members are omitted.

The backlight 20 in the present embodiment includes the light guide 24 having a shape different from that of the light guide 24 of the backlight 20 in the first embodiment.

That is, the light guide 24 in the first embodiment has the substantially mountain shape, and has the first light emitting face 24a and the second light emitting face 24b, which serve as planes.

On the other hand, the light guide 24 of the second embodiment has a shape, which is formed by a combination of prism shapes, thereby the light emitting face is not a single plane. As a whole, the shape seems to be a stepped projection shape (mountain shape). More specifically, the slant face of the mountain shape is not a single plane but is a face having a step formed by a combination of a plurality of prisms. The slant face declines in stages due to the step formed by the combination of the plurality of the planes (prism planes).

The following describes the backlight of the present embodiment with reference to FIG. 7 which is a cross-sectional view illustrating a schematic structure of the backlight.

As shown in FIG. 7, the light guide 24 of the present embodiment has a substantially stepped projection shape (mountain shape) as a whole. Note however that, the slant has a step.

That is, the slant of the mountain shape includes a step formed by (i) an transverse plane 24s which extends mainly in width direction of the light guide 24 and (ii) a longitudinal plane 24t which descends mainly in a thickness direction of the light guide 24. Further, in the present embodiment, as to a proportion of areas of the transverse plane 24s and the longitudinal plane 24t, the transverse plane 24s is larger. In other words, in the cross-sectional view of the light guide 24, a cross-sectional length of the transverse plane 24s is longer than the cross-sectional length of the longitudinal plane 24t.

More specifically, in the present embodiment, the top 24f of the light guide 24 is formed by the transverse plane 24s which is parallel to the bottom surface 24c of the light guide 24. That is, an angle (see the angle R1 shown in FIG. 4) formed by the transverse plane 24s and the bottom surface 24c is 0 degree.

Further, the longitudinal planes 24t are provided on both sides of the transverse plane 24s including the top 24f. An angle (see the angle R2 shown in FIG. 7) formed by the transverse plane 24s and the longitudinal plane 24t is 95 degrees. That is, an angle (see the angle R3 shown in FIG. 7) formed by a perpendicular line to the bottom surface 24c and the longitudinal plane 24t is 5 degrees. As above described, in the present embodiment, an apex angle of the prism shape (which is the same as the angle R2 shown in FIG. 7) formed by the transverse plane 24s and the longitudinal plane 24t is set to 90 degrees or more.

Further, the combinations of the transverse plane 24s and the longitudinal plane 24t are added at three sections (repeated three times), so as to form three steps in each of the slant faces of the mountain shape.

(Transmission of Light)

In the backlight 20 of the present embodiment, as described above, each of the light emitting faces of the light guide 24 has steps formed by the prism shapes. With the configuration, light can be emitted outward from only the longitudinal plane 24t of the light guide 24, not from the entire surface of the slant face (e.g., the first light emitting face 24a and the second light emitting face 24b in the first embodiment) of the mountain shape.

This makes it possible to easily control the direction and the amount of the light emission.

Third Embodiment

Figure 8:
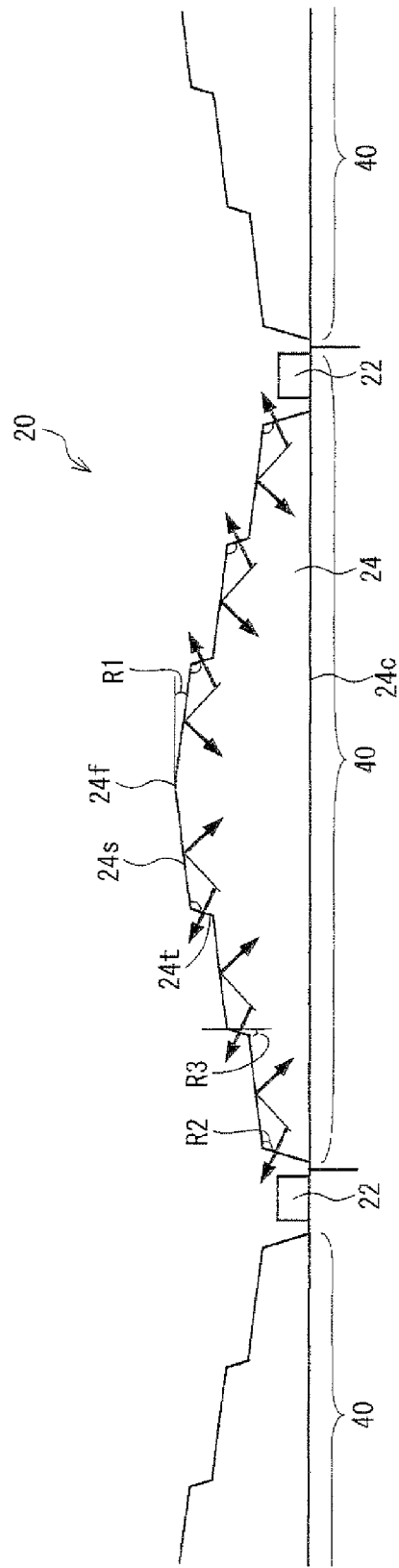
FIG. 8 is a cross-sectional view illustrating a schematic structure of a backlight in yet another embodiment of the present invention.

The following describes a third embodiment of the present invention with reference to FIG. 8. Note that, in the present embodiment, configurations which are not described in the present embodiment are the same as those in the first and second embodiments. Moreover, for convenience of explanation, members having the same functions as those shown in the drawings of the first and second embodiments are given the same reference numerals, and explanations of the members are omitted.

The backlight 20 in the present embodiment includes the light guide 24 having a shape different from that of the light guide 24 of the backlight 20 in the second embodiment.

In the light guide 24 of the second embodiment, the transverse plane 24s forming the slant face of the mountain shape is parallel to the bottom surface 24c of the light guide 24. That is, the angle (see (i) the angle R1 shown in FIG. 4 and (ii) FIG. 7) formed by the transverse plane 24s and the bottom surface 24c is 0 degree.

On the other hand, in the present embodiment, the transverse plane 24s is not parallel to the bottom surface 24c, but is slanted.

The following describes the backlight of the present embodiment with reference to FIG. 8 which is a cross-sectional view illustrating a schematic structure of the backlight.

As shown in FIG. 8, in the light guide 24 of the present embodiment, the transverse plane 24s is not parallel to the bottom surface 24c, but is slanted by 10 degrees with respect to the parallel. That is, the angle R1 (which is the same as the angle R1 in FIG. 4) in FIG. 8 is 10 degrees.

Further, an angle (angle R2 in FIG. 8) formed by the transverse plane 24s and the bottom surface 24c, i.e., the apex angle of the prism, is 105 degrees.

This is because, in the present embodiment, the transverse plane 24s is slanted by 10 degrees with respect to the bottom surface 24c as described above. Note however that, an angle (see the angle R3 in FIG. 8) formed by a perpendicular line to the bottom surface 24c and the longitudinal plane 24t is 5 degrees as with the second embodiment.

(Effect by Stepped Structure)

In the backlight 20 of the present embodiment, as described above, the light emitting face of the light guide 24 has the step formed by the prism shapes. Further, not only the transverse plane 24s but also the longitudinal plane 24t is slanted with respect to the bottom surface 24c of the light guide 24. Accordingly, light can be emitted from not only the longitudinal plane 24t but also the transverse plane 24s.

This leads to a more flexibility in controlling the direction and the (in-plane) amount of the light emitted outward from the light emitting body 24.

(Other Configurations)

Note that the configuration of the backlight 20 of the present invention is not limited to above described configurations, and can be modified in various ways.

For example, in the above description, the apex angle R3 of the prism shape formed by the transverse plane 24s and the longitudinal plane 24t is 95 degrees. However, the apex angle R3 is not limited to the angle.

Moreover, in the above description, the angle R1 formed by (i) each of the first light emitting face 24a, the second light emitting face 24b, and the transverse plane 24s and (ii) the bottom surface 24c is 10 degrees or 0 degree (in parallel). However, the angle R1 is not limited to the angles.

For example, in a case where R3 is set to 90 degrees or more and R1 is set to 0 degree or more but less than 60 degrees, the backlight 20 of each of the second embodiment and the third embodiment can selectively emit light with ease. That is, the backlight 20 can emit light only from the longitudinal plane 24t, while the transverse plane 24s of the light guide 24 totally reflects the light.

Moreover, in the description of the second embodiment and the third embodiment, three steps are formed by the prisms. However, in the backlight 20 of the present invention, the number of steps is not limited to be three, and for example, the steps may be formed more than three.

Moreover, in the description of the second embodiment and the third embodiment, as shown in FIG. 7 and FIG. 8, the transverse plane 24s has a cross-sectional length greater than that of the longitudinal plane 24t. However, the transverse plane 24s and the longitudinal plane 24t are not limited to the configuration, and can be set to have arbitrary lengths. In a case where the transverse plane 24s has a cross-sectional length greater than that of the longitudinal plane 24t, it becomes easier to control the angle of light emission, etc. with use of the configuration in which the light is emitted from the longitudinal plane 24t while the transverse plane 24s totally reflects the light, as described in the above example.

Moreover, in the above description, the cross-sectional shape of the light guide 24 is a symmetrical shape in which the top 24f of the light guide 24 serves as the axis of symmetry. However, the cross-sectional shape of the light guide 24 of the present invention is not limited to the shape, and can be modified in various ways.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The backlight of the present invention can achieve (i) a sufficient luminance even in a large area and (ii) excellent uniformity of in-plane luminance. Therefore, the backlight of the present invention is suitable for use in an application where a high display quality is required in a large-sized screen.

The invention claimed is:

1. A backlight comprising:
a plurality of light guide units arranged in a matrix pattern, the light guide units each comprising a light source; and
a light guide which performs surface emission of light received from the light source, wherein:
the light source is provided on a first end section of the light guide;
a reflective member which is capable of reflecting light in the light guide is provided on a second end section opposite to the first end section;
the light guide is continuously increased in thickness from the first end section toward a center of the light guide; and
the light guide is also continuously increased in thickness from the second end section toward the center of the light guide.

2. The backlight as set forth in claim 1, wherein: the light guide has a mountain shape cross-sectionally, from the first end section to the second end section.

3. The backlight as set forth in claim 2, wherein:
a slant face of the light guide in the mountain shape serves as a light emitting face for emitting the light received from the light source;
the light emitting face includes at least two faces whose slant directions are different from each other;
at least one of the light emitting faces slants so that a perpendicular line thereto is slanted toward the light source; and
at least another one of the light emitting faces slants so that a perpendicular line thereto is slanted away from the light source.

4. The backlight as set forth in claim 1, wherein: the light guide has a stepped projection shape cross-sectionally, from the first end section to the second end section.

5. The backlight as set forth in claim 4, wherein: the stepped projection shape has at least one step between (i) a top of the stepped portion and (ii) each of the first end section and the second end section.

6. The backlight as set forth in claim 5, wherein:
the step is formed from a combination of a transverse plane and a longitudinal plane;
the transverse plane and a bottom plane of the light guide form an angle of 0 degree or more but 60 degrees or less; and
the transverse plane and the longitudinal plane form an angle of 90 degrees or more but less than 180 degrees.

7. The backlight as set forth in claim 5, wherein: a prism constitutes the step.

8. The backlight as set forth in claim 1, wherein: the light guide is provided with a reflective member on its bottom surface.

9. The backlight as set forth in claim 1, wherein: the second end section is thicker than or equal to the first end section.

10. The backlight as set forth in claim 1, wherein: the reflective member has a height greater in size than or equal to the thickness of the first end section.

11. The backlight as set forth in claim 7, wherein: the prism has an apex angle of 90 degrees or more but less than 180 degrees.

12. An illuminating device comprising: the backlight and light guide units as set forth in claim 1, the light guide units being arranged regularly.

13. A liquid crystal display device comprising: an illuminating device as set forth in claim 12 as a backlight.

14. The backlight of claim 1, wherein the light guide is continuously increased in thickness from the second end section toward the center of the light guide so that the light guide is substantially mountain-shaped as viewed in cross section, and wherein an apex of the mountain of the substantially mountain-shaped light guide is at a surface of the light guide closest to a display panel toward which the light guide unit emits light and wherein said surface of the light guide containing the apex is a light-emitting surface of the light guide.

* * * * *